United States Patent
Nakashima et al.

(10) Patent No.: US 6,940,220 B2
(45) Date of Patent: Sep. 6, 2005

(54) GLASS, METHOD FOR ITS PRODUCTION, AND FED DEVICE

(75) Inventors: Tetsuya Nakashima, Yokohama (JP); Kei Maeda, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/756,508

(22) Filed: Jan. 14, 2004

(65) Prior Publication Data

US 2004/0145297 A1 Jul. 29, 2004

Related U.S. Application Data

(63) Continuation of application No. PCT/JP03/05825, filed on May 9, 2003.

(30) Foreign Application Priority Data

May 14, 2002 (JP) .......................... 2002-138589

(51) Int. Cl.$^7$ .......................... H01J 1/62; C03C 3/076; C03C 3/095; C03C 3/078; C03C 3/062

(52) U.S. Cl. .......................... 313/495; 501/55; 501/64; 501/72; 501/73

(58) Field of Search .............................. 501/55, 64, 72, 501/73; 313/495

(56) References Cited

U.S. PATENT DOCUMENTS 4,612,295 A 9/1986 Sagara

FOREIGN PATENT DOCUMENTS

| DE | 28 09 409 | 9/1978 |
|----|-----------|--------|
| JP | 50-53413 | 5/1975 |
| JP | 53-109514 | 9/1978 |
| JP | 60-21828 | 2/1985 |
| JP | 7-230776 | 8/1995 |
| JP | 9-197453 | 7/1997 |
| JP | 2003-77409 | 3/2003 |

*Primary Examiner*—Elizabeth D. Wood
(74) *Attorney, Agent, or Firm*—Oblon, Spivak, McClelland, Maier & Neustadt, P.C.

(57) ABSTRACT

Glass comprises essentially 20–70% $SiO_2$, 10–50% $TiO_2+Nb_2O_5+SnO_2+Ta_2O_5+WO_3+CeO_2$, 0–50% $MgO+CaO+SrO+BaO+ZnO$, and 0–30% $B_2O_3+Al_2O_3$, in molar percentage terms based on the oxides; and has a resistivity of at most $10^{15}$ Ω·cm at 20° C. A method for production of glass is to produce the glass under such a condition that a redox represented by $[Fe^{2+}]/([Fe^{2+}]+[Fe^{3+}])$ where Fe is present in the glass, is at least 0.6.

22 Claims, 1 Drawing Sheet

GLASS, METHOD FOR ITS PRODUCTION, AND FED DEVICE

TECHNICAL FIELD

The present invention relates to a glass having a low resistivity, a method for its production, and a field emission display device (hereinafter, referred to as "FED").

BACKGROUND ART

An FED is a cathode-ray tube (CRT) panel having a large number of microscopic electron guns of micron size arranged corresponding to each of pixels.

Since the FED, in which the electron guns are driven in each of the pixels independently of each other, requires no scan of an electron beam over a wide angle range unlike the CRT panels, it is a display far thinner and flatter than the CRT panels (e.g., reference should be made to JP-A-07-230776). Particularly, the FED is expected as a large-screen flat display of at least 40 inches, which is hardly realized by the CRT panels.

In the FED, an anode panel with phosphors faces an emitter panel with emitters for emitting electrons, through a plurality of spacers, and the periphery of the anode panel and emitter panel is sealed with a glass paste or the like.

The internal space of FED, i.e., the space between the anode panel and the emitter panel facing each other is typically in a high vacuum state of $10^{-3}$–$10^{-5}$ Pa, and electrons emitted from an emitter of the emitter panel into the space impinge upon a phosphor of the anode panel to induce electron beam induced luminescence. As a result, a pixel to which the phosphor belongs develops a color.

The distance between the anode panel and the emitter panel facing each other is typically 1–2 mm, and, in order to keep the distance independently of the pressure difference between the atmospheric pressure and the pressure of the internal space (e.g., $10^{-3}$–$10^{-5}$ Pa), the spacers are interposed between the anode panel and the emitter panel, as described above. The conventional spacers were made of alumina.

The spacers of alumina were likely to be charged with electrons, which raised the problem that the display image tended to be distorted.

The Inventors of the present invention previously have invented the glass containing 40–80 mol % $SiO_2$, 1–20 mol % $Al_2O_3$, 15–50 mol % $Li_2O+Na_2O+K_2O$, 0–10 mol % $TiO_2$, and 0–10 mol % $ZrO_2$ for spacers capable of preventing the charging.

The glass has a low resistivity and the spacers made thereof have the resistance low enough to effectively prevent the charging. However, the glass is an ion-conducting glass containing an alkali metal oxide at least 15 mol % and the resistance of the spacers might increase as a lapse of time. Namely, application of an electric field brings about polarization in the spacers, so that the resistance of the spacers can increase.

An object of the present invention is to provide a glass which has a low alkali metal oxide content and which is resistant to polarization under application of an electric field in use as spacers, a method for its production, and an FED.

DISCLOSURE OF THE INVENTION

The present invention provides a glass comprising essentially 20–70% $SiO_2$, 10–50% $TiO_2+Nb_2O_5+SnO_2+Ta_2O_5+WO_3+CeO_2$, 0–50% $MgO+CaO+SrO+BaO+Zno$, and 0–30% $B_2O_3+Al_2O_3$, in molar percentage terms based on the oxides; and having a resistivity (hereinafter denoted by "$\rho$") of at most $10^{15}$ $\Omega \cdot cm$ at 20° C. (the first glass of the present invention).

The present invention also provides a method for production of glass comprising melting raw materials which are prepared so as to obtain a glass comprising essentially 20–70% $SiO_2$, 10–50% $TiO_2+Nb_2O_5+SnO_2+Ta_2O_5+WO_3+CeO_2$, 0–50% $MgO+CaO+SrO+BaO+Zno$, and 0–30% $B_2O_3+Al_2O_3$, in molar percentage terms based on the oxides, wherein the glass is produced under such a condition that a redox R represented by $[Fe^{2+}]/([Fe^{2+}]+[Fe^{3+}])$ where Fe is present in the glass, is at least 0.6 (the production method of the present invention).

The present invention further provides a glass produced by the aforementioned method for production of glass, which has the $\rho$ of at most $10^{15}$ $\Omega \cdot cm$ (the second glass of the present invention).

Furthermore, the present invention provides a field emission display device comprising an anode panel having a phosphor, an emitter panel having an emitter for emitting an electron, and a plurality of spacers, the anode panel and the emitter panel facing each other through the spacers, wherein the spacers are the aforementioned glass (the FED of the present invention).

The Inventors have found that when glass contains many ions with a valency easy to vary, such as transition metal ions, and ions with different valencies mixed, the resistivity of glass can be reduced in spite of the alkali metal oxide content being low, and accomplished the present invention based thereon. Furthermore, it is considered that the electric conduction in such glass results primarily from the electron conduction, with little contribution of the ion conduction.

BEST MODE FOR CARRYING OUT THE INVENTION

Figure 1:
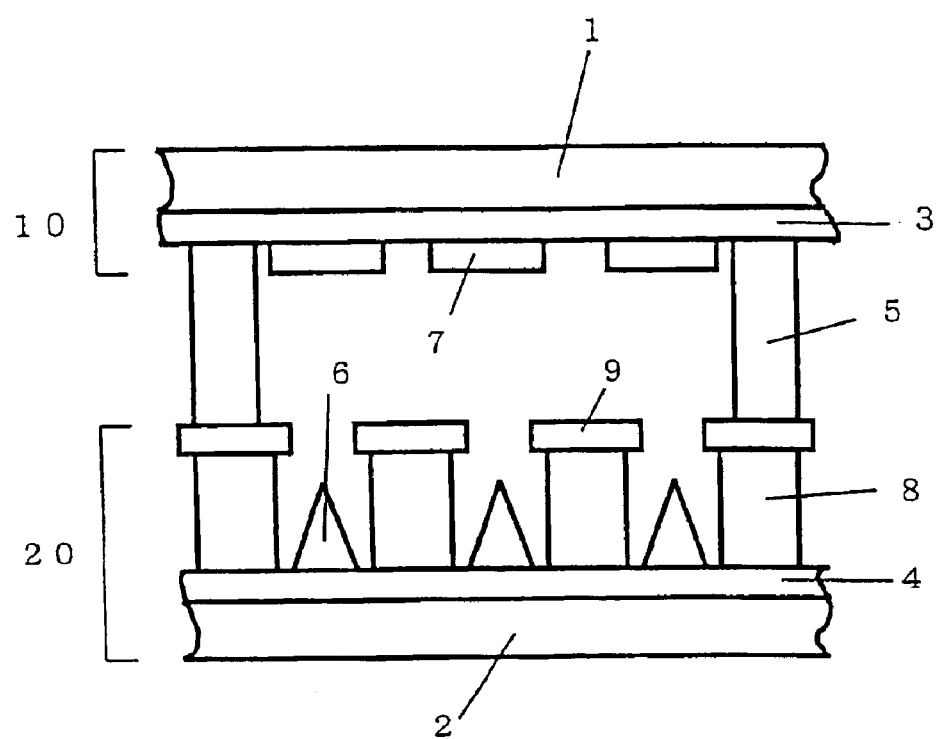
FIG. 1 is a schematic cross-sectional view of a portion of the FED according to the present invention.

The first glass of the present invention has the $\rho$ of at most $10^{15}$ $\Omega \cdot cm$ and is suitable for the spacers of FED. The $\rho$ is preferably at most $10^{14}$ $\Omega \cdot cm$, more preferably at most $10^{13}$ $\Omega \cdot cm$, and particularly preferably at most $10^{12}$ $\Omega \cdot cm$.

Furthermore, the first glass of the present invention preferably has an average linear expansion coefficient $\alpha$ of $60 \times 10^{-7}$–$110 \times 10^{-7}$/° C. in a range of 50–350° C. If the $\alpha$ is outside the above range, expansion matching might be difficult with FED glass substrates having a typical average linear expansion coefficient $\alpha$ of $75 \times 10^{-7}$–$90 \times 10^{-7}$/° C. The glass substrates are made, for example, of soda lime silica glass.

In addition, the first glass of the present invention preferably has a glass transition point of at least 500° C. If the glass transition point is less than 500° C., a dimensional change might occur when the glass is used for the spacers of FED and when the FED panel is sealed with glass frit or the like. The glass transition point is more preferably at least 700° C. and particularly preferably at least 740° C.

The composition of the first glass of the present invention will be described below using the simple terms of % in place of mol %.

$SiO_2$ is a component to form a framework of glass and to improve the stability and chemical durability of glass, and is essential for the glass. If the content of $SiO_2$ is less than 20%, the stability or chemical durability of the glass will degrade. The content of $SiO_2$ is preferably at least 25%, and more preferably at least 30%. If it exceeds 70%, the content of $TiO_2$, $Nb_2O_5$, $SnO_2$, $Ta_2O_5$, $WO_3$, or $CeO_2$ will be low, so as to result in an increase of ρ. The content of $SiO_2$ is preferably at most 65%, and more preferably at most 60%.

$TiO_2$, $Nb_2O_5$, $SnO_2$, $Ta_2O_5$, $WO_3$, and $CeO_2$ are components to decrease the ρ, and the glass has to contain at least one component out of these six components. If the total content of the six components ($TiO_2$+$Nb_2O_5$+$SnO_2$+$Ta_2O_5$+$WO_3$+$CeO_2$) is less than 10%, ρ will increase. The total content is preferably at least 15%. If the content exceeds 50%, the glass will become unstable or the chemical durability thereof will degrade. The total content is preferably at most 45%.

The Inventors believe that Ti, Nb, Sn, Ta, W, and Ce are sources of the aforementioned ions with a valency easy to vary, and that they cause the mixed ions with different valencies to reduce ρ.

The content of $Nb_2O_5$ is preferably 10–50 mol %.

Neither of MgO, CaO, SrO, BaO, and ZnO is essential, but the glass preferably contains at least one component among them, in order to make the glass stabler. In this case, the total content of the five components (MgO+CaO+SrO+BaO+ZnO) is preferably at least 10%. The total content is more preferably at least 15%. If the total content exceeds 50%, the glass will become unstable or the chemical durability thereof will degrade. The total content is preferably at most 45%.

Neither $B_2O_3$ nor $Al_2O_3$ is essential, but the glass may contain them in a range of at most 30% in total, in order to improve the stability or chemical durability of the glass. If the total content exceeds 30%, the glass will become unstable to the contrary. The total content is preferably at most 25%.

The first glass of the present invention comprises essentially the above components, and may further contain other components up to 10% in total; the total content thereof is preferably at most 5%.

The other components may be a refining agent such as $SO_3$, Cl, or the like; an alkali metal oxide such as $Li_2O$, $Na_2O$, $K_2O$, or the like; $La_2O_3$, $Y_2O_3$, and $Fe_2O_3$.

The total content of the refining agent such as $SO_3$, Cl, or the like is preferably at most 2%.

$Li_2O$, $Na_2O$, or $K_2O$ is effective to promotion of melting of the glass, and the glass may contain them, for example, up to 5% in total. If the total content exceeds 5%, the ion conduction might become stronger as described above. In cases where it is desirable to suppress the ion conduction, the glass preferably contains no alkali metal oxide.

The glass may contain $La_2O_3$ and/or $Y_2O_3$ in a range of at most 15% in total, in order to make the glass stabler or improve the glass in the chemical durability. If the total amount exceeds 15%, the glass will become unstable to the contrary. Where the glass contains $La_2O_3$ and/or $Y_2O_3$, the total amount thereof is preferably at least 1% and more preferably at least 2%.

The first glass of the present invention is preferably produced by the production method of the present invention.

The production method of the present invention is suitable for production of glass demonstrating low ion conduction and having the ρ being small.

The production method of the present invention will be described below.

First, raw materials are blended so as to obtain the glass comprising essentially 20–70% $SiO_2$, 10–50% $TiO_2$+$Nb_2O_5$+$SnO_2$+$Ta_2O_5$+$WO_3$+$CeO_2$, 0–50% MgO+CaO+SrO+BaO+ZnO, and 0–30% $B_2O_3$+$Al_2O_3$, in molar percentage terms based on the oxides. The blended raw materials are mixed if necessary. The present invention includes cases wherein the blended raw materials are glass cullet.

The glass may contain $La_2O_3$ and/or $Y_2O_3$ in the total amount of at most 15%.

The blended raw materials are melted into glass, and the redox R of the glass is at least 0.6. If the redox R is less than 0.6, ρ of the glass will increase.

If the ρ of the glass is desired to be set to at most $10^{14}$ Ω·cm, to at most $10^{13.5}$ Ω·cm, or to at most $10^{12}$ Ω·cm, R is preferably controlled in the range of at least 0.65, at least 0.9, or at least 0.95, respectively.

In order to increase the redox R, an ambient atmosphere during the melting of the glass can be a reducing one using city gas or the like.

The partial pressure p of oxygen in the reducing ambience is preferably at most $10^{-4}$ atm. In cases where the oxygen partial pressure p is at most $10^{-7}$ atm, it is preferable to melt the glass with use of an $H_2$ flow electric furnace with the dew point and the oxygen concentration controlled, an electric furnace filled with an inert gas inside in an oxygen concentration of under ppm order and having an oxygen getter such as carbon or a metal, or the like.

Another potential way is such that the glass is melted in the atmospheric ambience and is then subjected to the following reducing treatment. Namely, the reducing treatment is carried out as follows: the glass is maintained in the $H_2$ flow electric furnace with the dew point and oxygen concentration controlled, the electric furnace filled with the inert gas inside in the oxygen concentration of under ppm order and having the oxygen getter such as carbon or a metal inside, or the like.

The reducing treatment is preferably conducted in a temperature range of (Tg−100° C.) to (Tg+50° C.) where Tg represents the glass transition point of the glass. If the temperature is less than (Tg−100° C.), the reduction might take too much time. On the other hand, if the temperature exceeds (Tg+50° C.), the glass might deform.

Furthermore, the glass is preferably retained in the preferred temperature range for a period of at least one hour. If the period is less than one hour, the reduction might be inadequate.

When the glass contains Fe, for example, in an amount of at least 0.01 mol % as $Fe_2O_3$, the R can be determined from the result of wet analysis, spectral transmittance measurement, or the like.

If the Fe content as $Fe_2O_3$ in the glass is less than 0.01 mol % and is too low to measure the R, the production method of the present invention can be carried out as follows.

Namely, Fe is added into blended raw materials for production of a glass whose R is difficult to measure, so that the Fe content as $Fe_2O_3$ falls in a range of 0.01–1 mol %. R is measured for the glass obtained by melting them. This R measured is regarded as R of the glass whose R is difficult to measure, obtained by melting in the same manner except that no Fe is added into the raw materials. The blended raw materials are melted under such a condition that this R is at least 0.6, to carry out the production method of the present invention.

The glass produced by the production method of the present invention is the second glass of the present invention.

The ρ of the second glass of the present invention is preferably at most $10^{15}$ Ω·cm, more preferably at most $10^{14}$ Ω·cm, particularly preferably at most $10^{13}$ Ω·cm, and most preferably at most $10^{12}$ Ω·cm.

If the second glass of the present invention contains Nb, it is considered that $Nb^{5+}$ and $Nb^{4+}$ ions are mixed in the glass and develop non-ion conduction, i.e., electron conduction, so as to decrease the ρ. If the ambience in melting the glass is a reducing one, at least part of the $Nb^{4+}$ ions are considered to be those changed during the melting from the $Nb^{5+}$ ions having existed in the raw materials.

The FED of the present invention uses the first glass or the second glass of the present invention for the spacers thereof.

The known systems for the FED include the diode system, the triode system, the tetrode system (a metal plate focusing electrode type, a thin film focusing electrode type, etc.), and so on. The system for the FED of the present invention is not restricted to a specific system, but may be any one of these systems.

The FED of the present invention will be described below with reference to FIG. 1 showing the schematic cross section of part of the FED of the present invention adopting the triode system.

An anode panel 10 having phosphors 7 faces an emitter panel 20 having emitters 6 for emitting electrons, through a plurality of spacers 5 (two spacers in FIG. 1).

The anode panel 10 generally consists of a front substrate 1 being a transparent plate such as a glass plate; an anode electrode 3 being a transparent electrode formed on the surface opposed to the emitter panel 20, of the front substrate 1; the phosphors 7 formed on the anode electrode 3; and others.

The glass plate used for the front substrate 1 can be a soda lime silica glass plate having a thickness of 1–3 mm, for example.

The transparent electrode used for the anode electrode 3 can be an ITO (In-doped tin oxide) film having a thickness of 0.01–100 μm, for example.

For example, the phosphors 7 are so formed, as shown in FIG. 1, that fluorescent materials of three colors of red (R), green (G), and blue (B) in each pixel are arranged in a stripe pattern through black stripes (not shown). Here, the three phosphors 7 shown in FIG. 1 are the fluorescent materials of R, G, and B in this order from the left.

The emitter panel 20 has the emitters 6 as an essential element and, in the triode system, it further has gate electrodes 9 and insulating layers 8 as essential elements. The gate electrodes 9 and the insulating layers 8 are unnecessary in the diode system.

In the triode system, the emitter panel 20 generally consists of a back substrate 2 being a glass plate or the like; a cathode electrode 4 formed on the surface opposed to the anode panel 10, of the back substrate 2; the emitters 6 and the insulating layers 8 formed on the cathode electrode 4; the gate electrodes 9 formed on the insulating layers 8; and others.

The glass plate used for the back substrate 2 can be a soda lime silica glass plate having a thickness of 1–3 mm, for example.

The electrode used for the cathode electrode 4 can be, for example, a metal film of Al, Ag, or the like, or an ITO (In-doped tin oxide) film having a thickness of 0.01–100 μm.

The emitters 6 are devices that emit electrons from their surface toward the phosphors 7, and can be, for example, diamond-like carbon (Diamond Like Carbon) emitters, carbon nanotube electron sources, field emitters made by anisotropic etching of Si, field emitters evaporated with a metal such as Mo. There are no restrictions on the shape of the emitters, and FIG. 1 shows those of conical shape; typically, the height and diameter of the bottom face both are 0.1–100 μm and the number of emitters is from a few hundreds to a few thousands per pixel. Furthermore, the size of one pixel is approximately 300 μm×300 μm.

In the diode system, it is often the case that anode electrodes are formed in a stripe pattern, cathode electrodes are formed in a stripe pattern perpendicular to the anode electrodes, and the emitters are diamond-like carbon films formed on the cathode electrodes.

The gate electrodes 9 are formed in order to control the amount of electrons emitted from the emitters 6 and are, for example, films of a metal such as a Pt-based alloy having a thickness of 0.001–0.1 μm.

The insulating layers 8 are provided in order to locate the gate electrodes 9 at desired positions relative to the emitters 6 and electrically insulate the gate electrodes 9 from the cathode electrode 4, and are, for example, oxide ceramic films or $PbO$—$SiO_2$—RO-based low-melting glass films having a thickness of 0.1–100 μm. Here RO represents an alkaline-earth metal oxide.

The spacers 5 are provided in order to maintain the distance between the anode panel 10 and the emitter panel 20 at a desired value against the pressure difference between the atmospheric pressure and the pressure in the internal space of FED (e.g., $10^{-3}$–$10^{-5}$ Pa), and, typically, they have a height of 1–2 mm and a width of 0.01–0.5 mm.

In the FED of the present invention, the spacers 5 are made of the first glass or the second glass of the present invention.

The glass transition point of the spacers 5 is preferably at least 500° C. If it is less than 500° C., a dimensional change might occur in sealing the FED panel with glass frit or the like. It is more preferably at least 600° C.

The FED of the present invention can be produced by a method similar to the production of the conventional FEDs, for example, using alumina spacers as spacers.

The first or second glass of the present invention (hereinafter referred to as "the glass of the present invention") is suitable for the spacers of FED, but it is by no means limited to such usage. For example, it is also suitably applicable to electrodes of secondary batteries, fuel cells, solar cells, pH meters, and so on. Among the glass of the present invention, particularly, one having the glass transition point of at least 700° C. is suitable for electrodes used in a high temperature range of at least 100° C. and less than 700° C.

Among the glass of the present invention, one having an activation energy of electric conduction of at least 0.2 eV, more preferably at least 0.4 eV, is suitable for sensors of thermistors and the like which are required to demonstrate a large change of resistivity against temperature.

Among the glass of the present invention, one having the ρ of at most $10^{10}$ Ω·cm, preferably at most $10^8$ Ω·cm, is applicable to prevention of fog on windowpane utilizing the Joule heating, reactors such as microreactors, and so on.

Among the glass of the present invention, one having a small ρ, e.g., at most $10^{10}$ Ω·cm, and the α of at least $70\times10^{-7}$/° C., preferably at least $75\times10^{-7}$/° C., and more preferably at least $80\times10^{-7}$/° C., is suitably applicable to switching-material MEMS (Micro-Electro-Mechanical Systems) and the like which are required to have a large thermal expansion coefficient.

Furthermore, among the glass of the present invention, one having a product κρ of the thermal conductivity κ and the ρ at room temperature, for example, of at most $10^{15}$ $V^2/K$, preferably at most $10^{14}$ $V^2/K$, and more preferably at most $10^{13}$ $V^2/K$ is suitably applicable to thermoelectric materials, and the like. Meanwhile, alumina has κρ of $3.8 \times 10^{19}$ $V^2/K$.

The glass of the present invention preferably contains neither Pb, V, As, Sb, Cd, nor Cr.

EXAMPLES

Raw materials were blended so as to have a composition of 40 mol % $SiO_2$, 20 mol % $Nb_2O_5$, and 40 mol % BaO, and melted at 1400° C. under various oxygen partial pressure atmospheres for 1 to 2 hours in a platinum or alumina crucible in an electric furnace. Then the molten glass was poured out and formed into a plate, followed by slow cooling (Examples 1–4). The raw materials in Example 1 were melted under the atmospheric ambience.

Table 1 presents the oxygen partial pressure p (unit: atm) in the melting ambience and the redox R in each of Examples 1–4.

p: a $ZrO_2$ oxygen sensor was inserted into the electric furnace and the oxygen partial pressure was measured using the atmospheric air (the oxygen partial pressure=0.2 atm) as a reference.

R: $Fe_2O_3$ was added in an amount of 0.1 mol % into the glass and the glass obtained by melting was subjected to the wet analysis to calculate $[Fe^{2+}]/([Fe^{2+}]+[Fe^{3+}])$.

For the glass plates thus obtained, the ρ (unit: Ω·cm), α, and the glass transition point Tg (unit: ° C.) were measured by the following methods.

ρ: Al was evaporated over the both surfaces of each sample having a size of 5 cm×5 cm and a thickness of 2 mm, and the resistivity at 20° C. was measured based on ASTM D257, using the Al layers as electrodes. For reference, $\rho_{20}$ of alumina is $10^{16}$ Ω·cm. Table 1 presents the results.

α: using a silica glass as a reference sample, expansivity of glass was measured with a differential thermodilatometer as temperature was increased at a rate of 5° C./min from room temperature up to the temperature at which glass softened to exhibit expansion no longer, i.e., the yielding point. An average linear expansion coefficient was determined from a thermal expansion curve obtained in the range of 50–350° C. The glasses of Examples 1–4 had the α of $86 \times 10^{-7}/°$ C. In contrast, alumina has the α of $72 \times 10^{-7}/°$ C.

Tg: a temperature corresponding to an inflection point in the thermal expansion curve, which was obtained in the same manner as in the measurement of the α, was regarded as the glass transition point. The glasses of Examples 1–4 had Tg of 786° C.

Furthermore, resistivities were measured at 20° C., 40° C., 60° C., 100° C., and 130° C. for the glass of Example 4, and data obtained were Arrhenius-plotted to determine the activation energy of electric conduction. It was 0.48 eV.

The κ was measured for the glass of Example 4, based on JIS R1611 and it was 0.77 W/m·K. Thus, the κρ of the glass of Example 4 is $7.7 \times 10^{12}$ $V^2/K$.

The chemical durability was evaluated as follows for each of the glasses of Examples 1–4. Namely, the glass was cut into a size of 4 cm×4 cm, and the both surfaces were polished and further mirror-polished to obtain a glass plate having a thickness of 2 mm. The glass plate was washed with calcium carbonate and a neutral detergent, and thereafter immersed in ion-exchanged water at 90° C. for 20 hours to determine a mass decrease by immersion per unit surface area, ΔW1. Mass decreases (ΔW2, ΔW3) were also determined in the same manner as above except that the ion-exchanged water was replaced by a hydrochloric acid aqueous solution having a concentration of 0.1 mol·dm$^{-3}$ or by a sodium hydroxide aqueous solution having a concentration of 0.1 mol·dm$^{-3}$, respectively.

The glasses of Examples 1–4 all demonstrated ΔW1 and ΔW3 of at most 0.01 mg/cm$^2$ and ΔW2 of 0.10 mg/cm$^2$.

ΔW1 is preferably at most 0.02 mg/cm$^2$. If it exceeds 0.02 mg/cm$^2$, the glass surfaces might deteriorate in a cleaning step or the like. It is more preferably at most 0.01 mg/cm$^2$.

ΔW2 is preferably at most 0.20 mg/cm$^2$. If it exceeds 0.20 mg/cm$^2$, the glass surfaces might deteriorate in an acid cleaning step, an acid etching step, or the like, or they might be corroded in use as electrodes dipped in an electrolyte solution. It is more preferably at most 0.15 mg/cm$^2$.

ΔW3 is preferably at most 0.20 mg/cm$^2$. If it exceeds 0.20 mg/cm$^2$, the glass surfaces might deteriorate in an alkali cleaning step, an alkali etching step, or the like, or they might be corroded in use as electrodes dipped in an electrolyte solution. It is more preferably at most 0.15 mg/cm$^2$, and particularly preferably at most 0.05 mg/cm$^2$.

TABLE 1

|   | Example 1 | Example 2 | Example 3 | Example 4 |
|---|---|---|---|---|
| p | $10^{-0.7}$ | $10^{-7}$ | $10^{-10}$ | $10^{-12}$ |
| R | 0.2 | 0.9 | At least 0.99 | At least 0.99 |
| ρ | $10^{16.1}$ | $10^{13.1}$ | $10^{11.2}$ | $10^{9.0}$ |

Furthermore, raw materials were blended so as to achieve each of the compositions in molar percentage terms in the columns of $SiO_2$ to $La_2O_3$ in Tables 2 and 3, put into the platinum crucible, and maintained at 1400–1500° C. under the atmospheric atmosphere for 2–5 hours to melt. Then the molten glass was poured out and formed into a plate, followed by slow cooling (Examples A–K).

Tables 2 and 3 provide the α (unit: $10^{-7}/°$ C.) and Tg (unit: ° C.) of these glasses.

Each glass obtained was cut into a size of 5 cm×5 cm, and the both surfaces thereof were polished and mirror-polished to obtain a glass plate having a thickness of 0.1–0.3 mm.

The glass plate was maintained for two hours in the electric furnace (temperature=785° C.) filled with a hydrogen-nitrogen mixed gas (hydrogen:nitrogen=2:8 (volume ratio), the dew point=−40° C.) under flow. The R of the glass obtained by this reducing treatment is presumed to be at least 0.99.

The ρ was measured for the glass plates after the reducing treatment. Tables 2 and 3 present the results.

TABLE 2

|  | Example A | Example B | Example C | Example D | Example E | Example F |
|---|---|---|---|---|---|---|
| $SiO_2$ | 45 | 40 | 40 | 45 | 40 | 40 |
| $Nb_2O_5$ | 20 | 22.5 | 22.5 | 15 | 25 | 20 |
| $CeO_2$ | 0 | 0 | 0 | 0 | 0 | 5 |
| CaO | 0 | 0 | 0 | 0 | 0 | 0 |
| SrO | 0 | 0 | 0 | 0 | 0 | 0 |
| BaO | 27.5 | 37.5 | 27.5 | 40 | 35 | 35 |
| $La_2O_3$ | 7.5 | 0 | 10 | 0 | 0 | 0 |
| α | 81 | 82 | 82 | 87 | 78 | 79 |
| Tg | 784 | 782 | 784 | 784 | 774 | 780 |
| ρ | $10^{9.6}$ | $10^{8.5}$ | $10^{9.9}$ | $10^{11.5}$ | $10^{7.0}$ | $10^{10.3}$ |

TABLE 3

|  | Example G | Example H | Example I | Example J | Example K |
|---|---|---|---|---|---|
| $SiO_2$ | 40 | 40 | 45 | 45 | 45 |
| $Nb_2O_5$ | 22.5 | 22.5 | 20 | 20 | 20 |
| $CeO_2$ | 0 | 0 | 0 | 0 | 0 |
| CaO | 5 | 5 | 3 | 3 | 0 |
| SrO | 0 | 0 | 0 | 0 | 3 |
| BaO | 32.5 | 27.5 | 24.5 | 27.5 | 24.5 |
| $La_2O_3$ | 0 | 5 | 7.5 | 4.5 | 7.5 |
| α | 80 | 82 | 79 | 77 | 78 |
| Tg | 772 | 772 | 779 | 774 | 781 |
| ρ | $10^{8.2}$ | $10^{8.8}$ | $10^{9.4}$ | $10^{8.7}$ | $10^{9.4}$ |

Industrial Applicability

The present invention yields a glass with low resistivity even in a small alkali metal oxide content.

Furthermore, spacers become unlikely to be charged, so that an FED can be produced with a display image resistant to distortion.

The entire disclosure of Japanese Patent Application No. 2002-138589 filed on May 14, 2002 including specification, claims, drawings and summary is incorporated herein by reference in its entirety.

What is claimed is:

1. A glass comprising 20–70% $SiO_2$, 10–50% $TiO_2$+$Nb_2O_5$+$SnO_2$+$Ta_2O_5$+$WO_3$+$CeO_2$, at least 10% BaO, and up to 50% MgO+CaO+SrO+BaO+ZnO, and 0–30% $B_2O_3$+$Al_2O_3$, in molar percentage terms based on the oxides; and having a resistivity of at most $10^{15}$ Ω·cm at 20° C.

2. The glass according to claim 1, which comprises 10–50 mol% $Nb_2O_5$.

3. The glass according to claim 1, which contains $La_2O_3$ and/or $Y_2O_3$ in a total amount of at most 15 mol %.

4. The glass according to claim 1, which has a glass transition point of at least 500° C.

5. A method for production of glass comprising melting raw materials which are prepared so as to obtain a glass comprising 20–70% $SiO_2$, 10–50% $TiO_2$+$Nb_2O_5$+$SnO_2$+$Ta_2O_5$+$WO_3$+$CeO_2$, 0–50% MgO+CaO+SrO+BaO+ZnO, and 0–30% $B_2O_3$+$Al_2O_3$, in molar percentage terms based on the oxides, and having a resistivity of at most $10^{15}$ Ω·cm at 20° C., wherein the glass is produced under such a condition that a redox R represented by [$Fe^{2+}$]/([$Fe^{2+}$]+[$Fe^{3+}$]) where Fe is present in the glass, is at least 0.6.

6. The method for production of glass according to claim 5, wherein the R is measured under the condition that a content of Fe as $Fe_2O_3$ is 0.01–1.0 mol %.

7. The method for production of glass according to claim 5, wherein the glass contains $La_2O_3$ and/or $Y_2O_3$ in a total amount of at most 15 mol %.

8. A glass produced by the method as defined in claim 5.

9. A field emission display device comprising an anode panel having a phosphor, an emitter panel having an emitter for emitting an electron, and a plurality of spacers, the anode panel and the emitter panel facing each other through the spacers, wherein the spacers are a glass comprising 20–70% $SiO_2$, 10–50% $TiO_2$+$Nb_2O_5$+$SnO_2$+$Ta_2O_5$+$WO_3$+$CeO_2$, 10–50% MgO+CaO+SrO+BaO+ZnO, and 0–30% $B_2O_3$+$Al_2O_3$, in molar percentage terms based on the oxides; and having a resistivity of at most $10^{15}$ Ω·cm at 20° C.

10. A device comprising a glass, the glass comprising 20–70% $SiO_2$, 10–50% $TiO_2$+$Nb_2O_5$+$SnO_2$+$Ta_2O_5$+$WO_3$+$CeO_2$, 0–50% MgO+CaO+SrO+BaO+ZnO, and 0–30% $B_2O_3$+$Al_2O_3$, in molar percentage terms based on the oxides; and having a resastivity of at most $10^{15}$ Ω·cm at 20° C., wherein the device is selected from the group consisting of electrodes, thermistor sensors, reactors, and switching-material micro-electro-mechanical systems.

11. The glass according to claim 1, which has a resistivity of at most most $10^{14}$ Ω·cm at 20° C.

12. The glass according to claim 1, which has a resistivity of at most most $10^{13}$ Ω·cm at 20° C.

13. The glass according to claim 1, which has a resistivity of at most most $10^{12}$ Ω·cm at 20° C.

14. The glass according to claim 1, which has an average linear expansion coefficient α of $60 \times 10^{-7}$–$110 \times 10^{-7}$/° C. in a range of 50–350° C.

15. The glass according to claim 4, which has a glass transition temperature of at least 700° C.

16. The glass according to claim 15, which has a glass transition temperature of at least 740° C.

17. The glass according to claim 1, wherein $SiO_2$ is present in an amount of 30–60%, $TiO_2$+$Nb_2O_5$+$SnO_2$+$Ta_2O_5$+$WO_3$+$CeO_2$ is present in an amount of 15–45%, MgO+CaO+SrO+BaO+ZnO is present in an amount of 15–45%, and $B_2O_3$+$Al_2O_3$ is present in an amount of 0–25%, in molar percentage terms based on the oxides.

18. The glass according to claim 1, wherein $Li_2O$, $Na_2O$, and $K_2O$ are present in an amount of 0–5%, in molar percentage terms based on the oxides.

19. The glass according to claim 3, wherein $La_2O_3$ and/or $Y_2O_3$ are present in a total amount of at least 1%.

20. The glass according to claim 19, wherein $La_2O_3$ and/or $Y_2O_3$ are present in a total amount of at least 2%.

21. A glass comprising 20–70% $SiO_2$, 10–50% $TiO_2$+$Nb_2O_5$+$SnO_2$+$Ta_2O_5$+$WO_3$+$CeO_2$, 0–50% MgO+CaO+SrO+BaO+ZnO, and 0–30% $B_2O_3$+$Al_2O_3$, in molar percentage terms based on the oxides; and having a resistivity of at most $10^{15}$ Ω·cm at 20° C.

22. The glass according to claim 21, which is obtainable by melting oxide raw materials for the glass and then subjecting the glass to a reduction treatment.

* * * * *